US009820616B2

(12) United States Patent
Goldfarb et al.

(10) Patent No.: US 9,820,616 B2
(45) Date of Patent: Nov. 21, 2017

(54) SECURABLE FOOD STORAGE CONTAINER ASSEMBLY

(71) Applicant: WKI Holding Company, Inc., Rosemont, IL (US)

(72) Inventors: Joshua Paul Goldfarb, Huntington Beach, CA (US); Kieron Hiuhon Tse, Mt. Prospect, IL (US); Nicolsson Fernandes, Upland, CA (US)

(73) Assignee: WKI HOLDING COMPANY, INC., Rosemont, IL (US)

( * ) Notice: Subject to any disclaimer, the term of this patent is extended or adjusted under 35 U.S.C. 154(b) by 125 days.

(21) Appl. No.: 14/829,126

(22) Filed: Aug. 18, 2015

(65) Prior Publication Data

US 2016/0257457 A1 Sep. 8, 2016

Related U.S. Application Data

(60) Provisional application No. 62/129,581, filed on Mar. 6, 2015.

(51) Int. Cl.
*A47J 47/08* (2006.01)
*B65D 43/06* (2006.01)
(Continued)

(52) U.S. Cl.
CPC ............... *A47J 47/08* (2013.01); *A47J 19/02* (2013.01); *B65D 21/0233* (2013.01);
(Continued)

(58) Field of Classification Search
CPC .... B65D 45/28; B65D 21/0233; B65D 43/06; B65D 24/30; B65D 2525/283; A47J 47/08; A47J 19/02
(Continued)

(56) References Cited

U.S. PATENT DOCUMENTS 4,034,889 A 7/1977 Hammes et al.
4,296,871 A 10/1981 Andersson
(Continued)

FOREIGN PATENT DOCUMENTS

WO WO 2010/150985 A2 12/2010
WO WO 2014/014160 A1 1/2014
(Continued)

*Primary Examiner* — Fenn C Mathew
*Assistant Examiner* — Elizabeth Volz
(74) *Attorney, Agent, or Firm* — McDermott Will & Emery LLP

(57) ABSTRACT

A plastic storage container assembly is disclosed comprising a storage container configured to receive a locking lid is disclosed. The storage container is comprised of a base, a generally curvilinear sidewall, a locking ledge and a resting ledge and handles. The sidewall has an inner surface and an outer surface and extends upwardly from the base. The sidewall terminates in a continuous curvilinear upper rim that has a generally parabolic profile and defines a terminal edge of the sidewall. The locking ledge traverses the outer surface of the sidewall and is defined by an outwardly projecting step in the sidewall. The locking ledge is disposed below the terminal edge of the sidewall. The resting ledge is disposed below the terminal edge of the sidewall. The storage container includes upwardly projecting first and second handles defining opposed sides of an upper extent of the sidewall.

19 Claims, 19 Drawing Sheets

(51) Int. Cl.
  *B65D 45/28* (2006.01)
  *A47J 19/02* (2006.01)
  *B65D 21/02* (2006.01)
  *B65D 25/30* (2006.01)

(52) U.S. Cl.
  CPC .............. *B65D 25/30* (2013.01); *B65D 43/06* (2013.01); *B65D 45/28* (2013.01); *B65D 2525/283* (2013.01)

(58) Field of Classification Search
  USPC ........ 220/4.26, 4.27, 528, 495.03, 771, 772, 220/768, 769, 656, 657, 659, 796, 801, 220/802, 805, 324, 23.89, 23.87, 752, 220/755, 751, 23.4, 574, 361, 315, 318; 73/426; 206/499, 505, 514
  See application file for complete search history.

(56) References Cited

U.S. PATENT DOCUMENTS

| | | | |
|---|---|---|---|
| 4,346,815 A | 8/1982 | Raymor et al. | |
| 4,500,010 A | 2/1985 | Schütz | |
| 5,356,026 A | 10/1994 | Andress et al. | |
| 6,793,096 B1 | 9/2004 | Seok | |
| 6,964,348 B2 | 11/2005 | Brelmon et al. | |
| 7,090,089 B2 | 8/2006 | Lown et al. | |
| 7,854,344 B2 | 12/2010 | Suk | |
| D631,708 S | 2/2011 | Smyers | |
| D634,165 S * | 3/2011 | Yang | D7/603 |
| 8,047,397 B2 | 11/2011 | Mittet | |
| 8,091,732 B2 | 1/2012 | Bryson et al. | |
| 8,251,245 B2 | 8/2012 | DiPietro et al. | |
| 8,376,181 B2 | 2/2013 | Lundgreen et al. | |
| D677,117 S | 3/2013 | Smyers | |
| D694,589 S | 12/2013 | Duvigneau | |
| D700,473 S | 3/2014 | Duvigneau | |
| 8,714,394 B2 | 5/2014 | Wulf | |
| 8,827,101 B2 | 9/2014 | Ye et al. | |
| 2008/0006631 A1 | 1/2008 | Booth et al. | |
| 2008/0041858 A1 | 2/2008 | Furlong et al. | |
| 2009/0078715 A1 | 3/2009 | Kim | |
| 2009/0200301 A1 * | 8/2009 | Beekman | B65D 81/3216 220/4.27 |
| 2012/0043336 A1 * | 2/2012 | Grider | A47J 36/06 220/573.1 |
| 2013/0233854 A1 | 9/2013 | Smyers et al. | |
| 2013/0334241 A1 * | 12/2013 | Abdi | B65D 25/287 220/826 |
| 2014/0042167 A1 * | 2/2014 | Lindsay | A47J 36/10 220/361 |
| 2014/0103033 A1 | 4/2014 | Beckman | |
| 2015/0014320 A1 | 1/2015 | Koo | |
| 2015/0099044 A1 | 4/2015 | Bowa | |
| 2015/0203264 A1 | 7/2015 | Im | |

FOREIGN PATENT DOCUMENTS

| | | |
|---|---|---|
| WO | WO 2014/105908 A2 | 7/2014 |
| WO | WO 2015/015241 A1 | 2/2015 |

* cited by examiner

SECURABLE FOOD STORAGE CONTAINER ASSEMBLY

CROSS-REFERENCE TO RELATED APPLICATIONS

This application claims priority from U.S. Provisional Application No. 62/129,581 filed on Mar. 6, 2015, which is incorporated herein by reference.

FIELD OF THE INVENTION

The present invention relates to a storage container assembly, and more particularly to a storage container for food items with securable locking lids.

BACKGROUND

A variety of containers and corresponding lids are known for storing items. When such containers are used for food storage, it is generally preferred for the container to include a lid that can be securably attached to the container for safe and secure transportation of the contents of the container.

The present invention is provided to address the problems discussed above and other problems, and to provide advantages and aspects not presently provided by container and lid assemblies. A full discussion of the features and advantages of certain preferred embodiments of the present invention is deferred to the following detailed description, which proceeds with reference to the accompanying drawings.

SUMMARY

According to the present invention, a securable storage container assembly is provided. The storage container is comprised of a base, a generally curvilinear sidewall, a locking ledge and a resting ledge and handles. The sidewall has an inner surface and an outer surface and extends upwardly from the base. The sidewall terminates in a continuous curvilinear upper rim that has a generally parabolic profile and defines a terminal edge of the sidewall. The locking ledge traverses the outer surface of the sidewall and is defined by an outwardly projecting step in the sidewall. The locking ledge is disposed below the terminal edge of the sidewall. The resting ledge traverses the inner surface of the sidewall and conforms to the step in the sidewall. The resting ledge is disposed below the terminal edge of the sidewall. The storage container includes upwardly projecting first and second handles defining opposed sides of an upper extent of the sidewall.

A lid for the storage container assembly is also provided. The lid includes a cover portion, a first locking arm and a second locking arm. The cover portion has a lid sidewall that extends downward and terminates at a lid terminal edge. The lid terminal edge is configured to abutingly engage the resting ledge of the container. The first locking arm connected to the sidewall of the lid, and the second locking arm connected to the sidewall of the lid at a position generally opposite the first locking arm. The first and second locking arm each have a tab member on an inner surface thereof. The tab members are configured for locking engagement with at least a portion of the locking ledge of the container.

The first and second locking arms are independently moveable between a first position and a second position. When the locking arms are in the first position, the locking arms extend generally outward from the lid sidewall. When the locking arms are in the second position, the locking arms pivot around the upper rim of the container at a position proximate the lowest extent of the parabolic profile of the upper rim and the tab members cooperatively engage the locking ledge.

A storage container is also disclosed wherein the storage container is comprised of a first container and a second container. According to that embodiment, each of the first and second containers is formed from a plastic material. The outer surface of the first container defines the sidewall of the storage container, and an inner surface of the second container define a generally curvilinear inner container sidewall. An upper extent of the inner container sidewall defining a resting ledge.

A method of securing a locking lid to a storage container is also provided. According to the method a storage container is provided. The storage container includes a base and a generally curvilinear sidewall having an inner surface and an outer surface. The sidewall extends upwardly from the base and terminates in a continuous curvilinear upper rim defining a terminal edge of the sidewall. The upper rim has a generally parabolic profile. A locking ledge traverses at least a portion of the outer surface of the sidewall, and the locking ledge is defined by an outwardly projecting step in the sidewall. The locking ledge is disposed below the terminal edge of the sidewall and a resting ledge traverses the inner surface of the sidewall. The resting ledge conforms to the step in the sidewall and is disposed below the terminal edge of the sidewall. Upwardly projecting first and second handles defines opposed sides of an upper extent of the sidewall.

A locking lid is also provided in which the locking lid includes a cover portion having a lid sidewall extending downward therefrom that terminates at a lid terminal edge. The lid terminal edge of the locking lid is configured to abutingly engage the resting ledge of the container. The locking lid also includes a first locking arm connected to the sidewall of the lid, and a second locking arm connected to the sidewall of the lid at a position generally opposite the first locking arm. Each locking arm has at least one tab member on an inner surface. The tab members are configured for locking engagement with at least a portion of the locking ledge of the container. The first and second locking arms are independently moveable between a first position and a second position. When the locking arms are in the first position, the locking arms extend generally outward from the lid sidewall. When the locking arms are in the second position, the locking arms pivot around the upper rim of the container at a position proximate the lowest extent of the parabolic profile of the upper rim and the tab members cooperatively engage the locking ledge.

The method further includes the steps of positioning the first and second locking arms at a position proximate the lowest extent of the parabolic profile of the upper and between the first and second handle, and moving the first and second locking arms to the second position, causing the tab members to cooperatively engage the locking ledge.

Other features and advantages of the invention will be apparent from the following specification taken in conjunction with the following drawings.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

Figure 1:
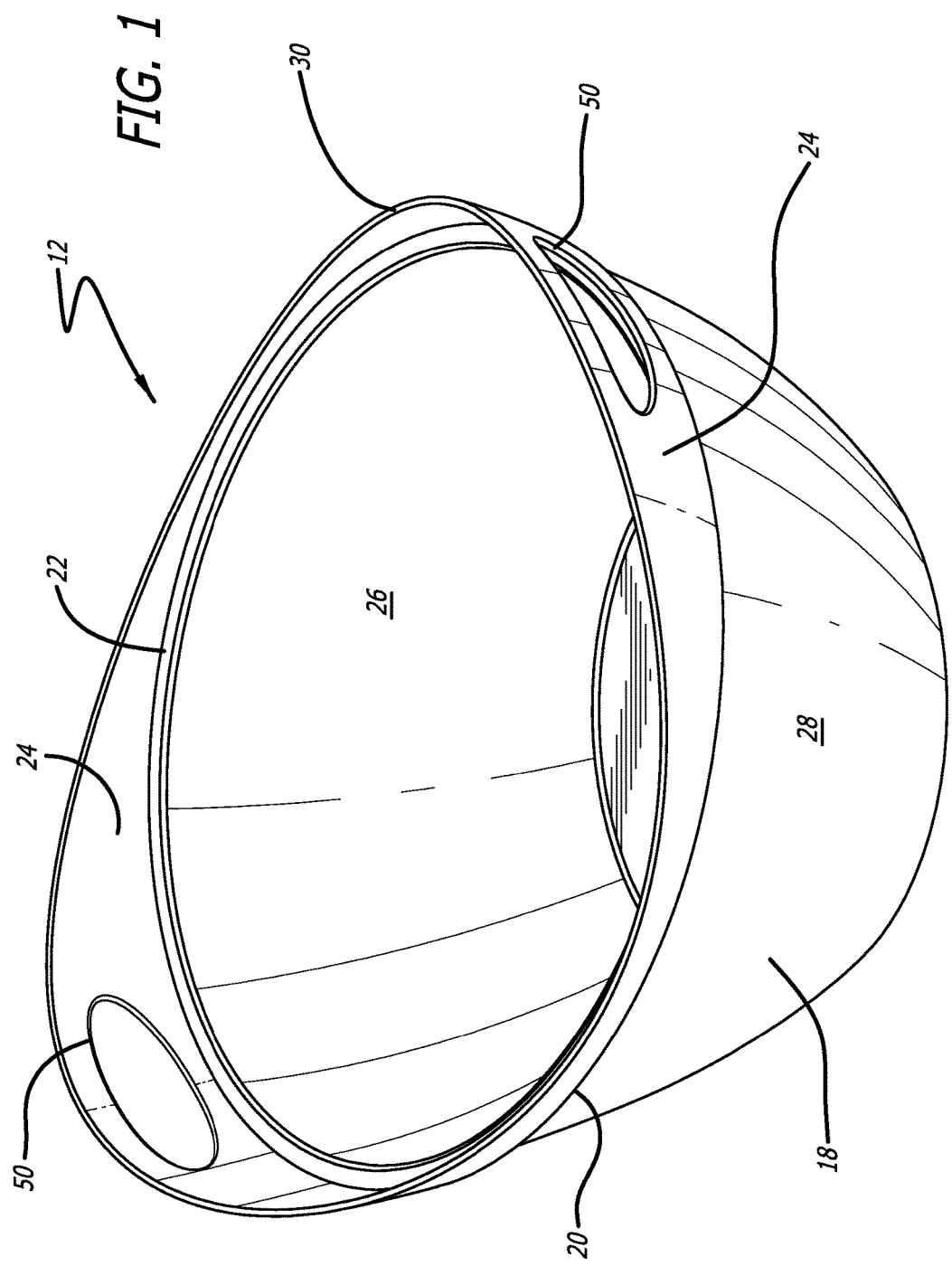
FIG. 1 is a top perspective view of a storage container for the storage container of the present invention.
Figure 2:
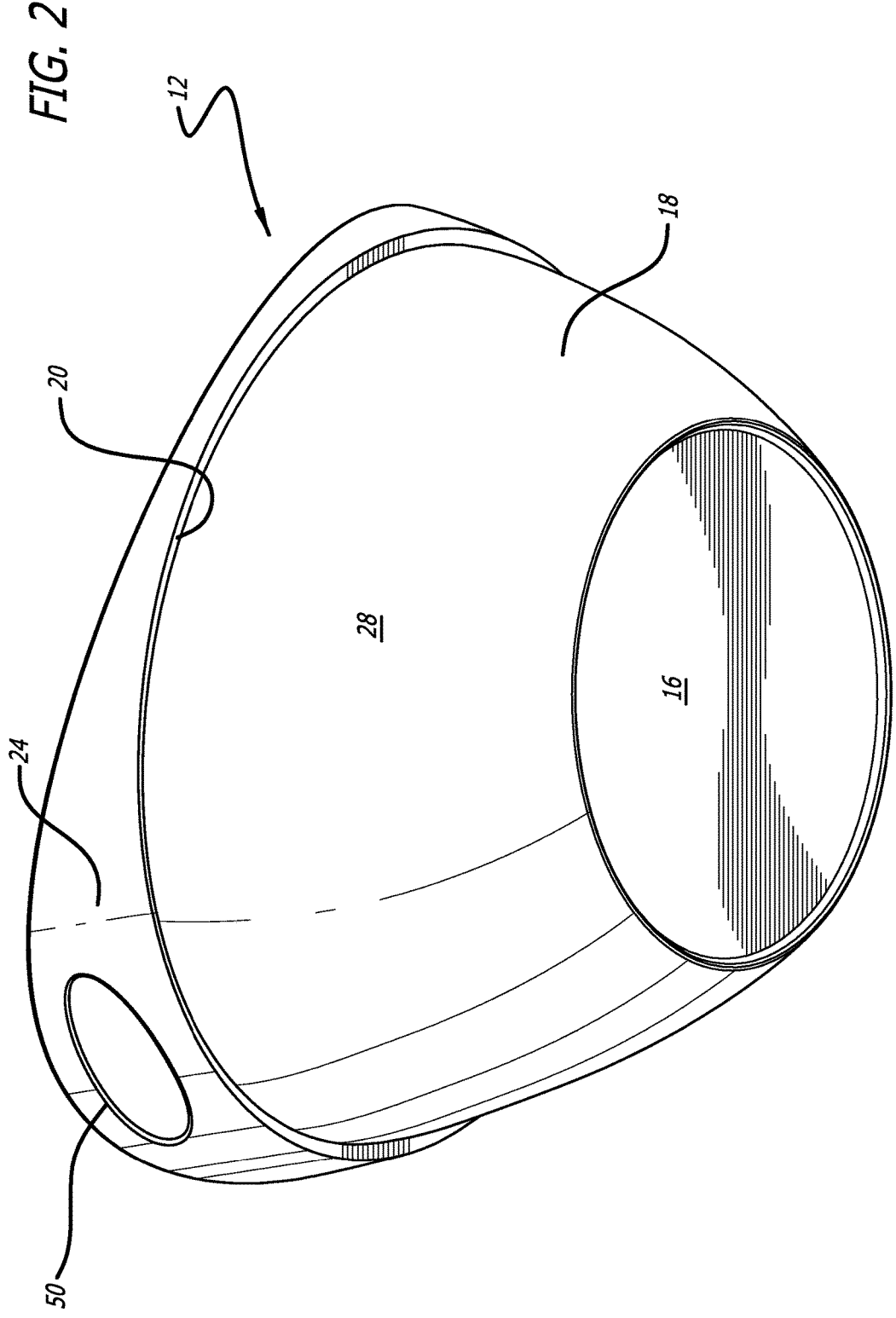
FIG. 2 is a bottom perspective view of the storage container shown in FIG. 1.

The components in the drawings are not necessarily to scale, emphasis instead being placed upon clearly illustrating the principles of the present invention.

DETAILED DESCRIPTION

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Disclosed herein are various embodiments of a storage container and lid assembly 10. The storage container assembly includes a storage container configured to receive a locking lid. In one embodiment shown in FIGS. 1-8, the storage container 12 is comprised of a base 16, a generally curvilinear sidewall 18, a locking ledge 20, a resting ledge 22 and first and second upwardly projecting opposed handles 24. In one embodiment, each of the first and second handles 24 includes at least one aperture 50 that allows a user to grasp the storage container 12. The sidewall 18 has an inner surface 26 and an outer surface 28 and extends upwardly from the base 16. The sidewall 18 terminates in a continuous curvilinear upper rim 30 that has a generally parabolic profile and defines a terminal edge of the sidewall 18. The locking ledge 20 traverses the outer surface 28 of the sidewall 18 and is defined by an outwardly projecting step in the sidewall 18. The locking ledge 20 is disposed below the terminal edge of the sidewall 18. According to the embodiment shown in FIGS. 1-11, the locking ledge 20 traverses the entire the outer surface 28 of the sidewall 18. However, it is contemplated by the present invention that the locking ledge 20 can traverse less than the entirety of the outer surface 28 of the storage container 12 as long as the locking ledge 20 presents a suitable locking surface area for engagement of the locking arm tab members 44 as described below.

The resting ledge 22 traverses the inner surface 26 of the sidewall 18 and conforms to a step in the sidewall 18. The resting ledge 22 is disposed below the terminal edge of the sidewall 18. The storage container 12 includes upwardly projecting first and second handles 24 formed in opposed sides of an upper extent of the sidewall 18. According to one embodiment, the first and second handles each include at least one aperture 50 therein.

Figure 9:
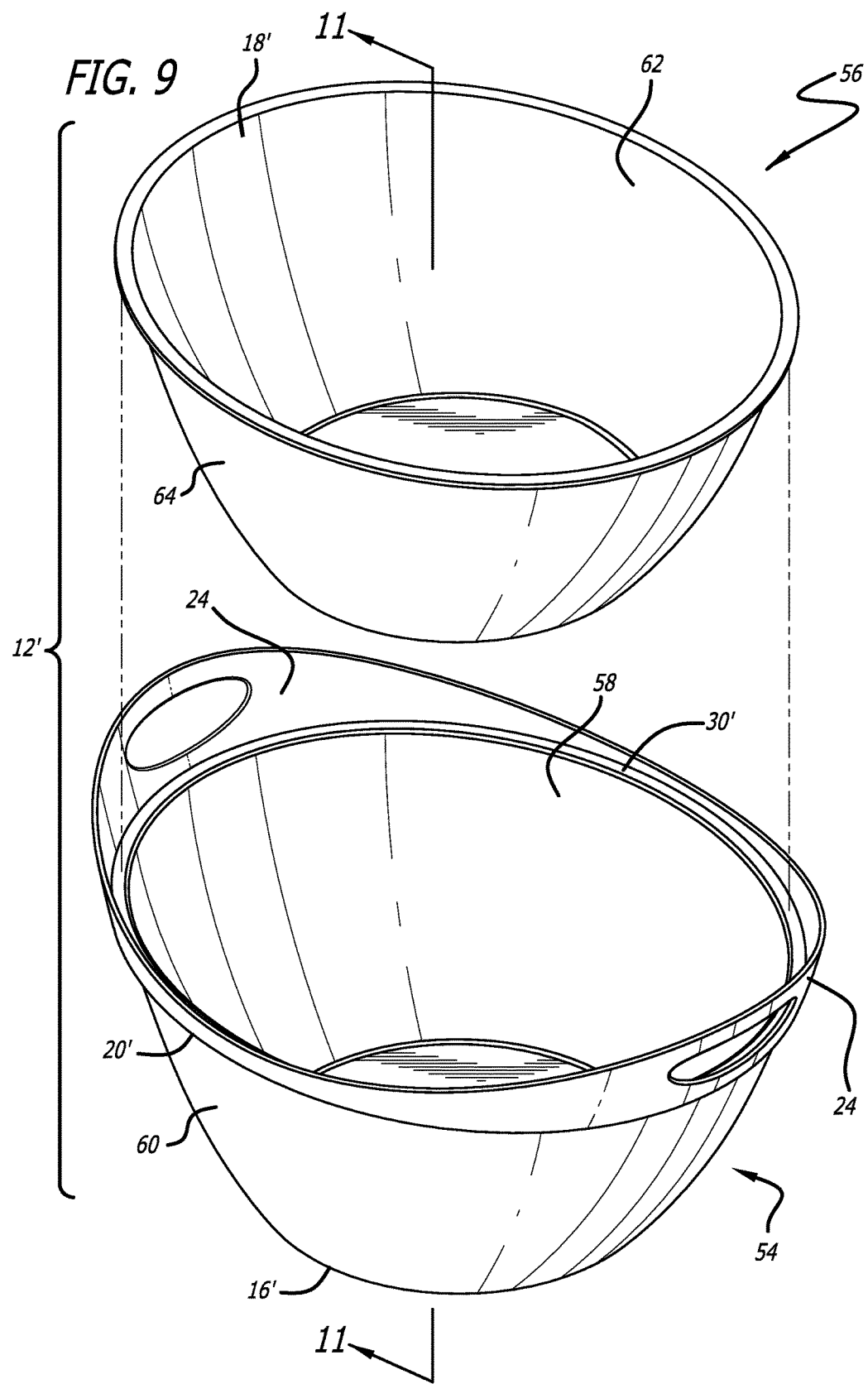
FIG. 9 is an exploded top perspective view of another embodiment of a storage container of the present invention.
Figure 10:
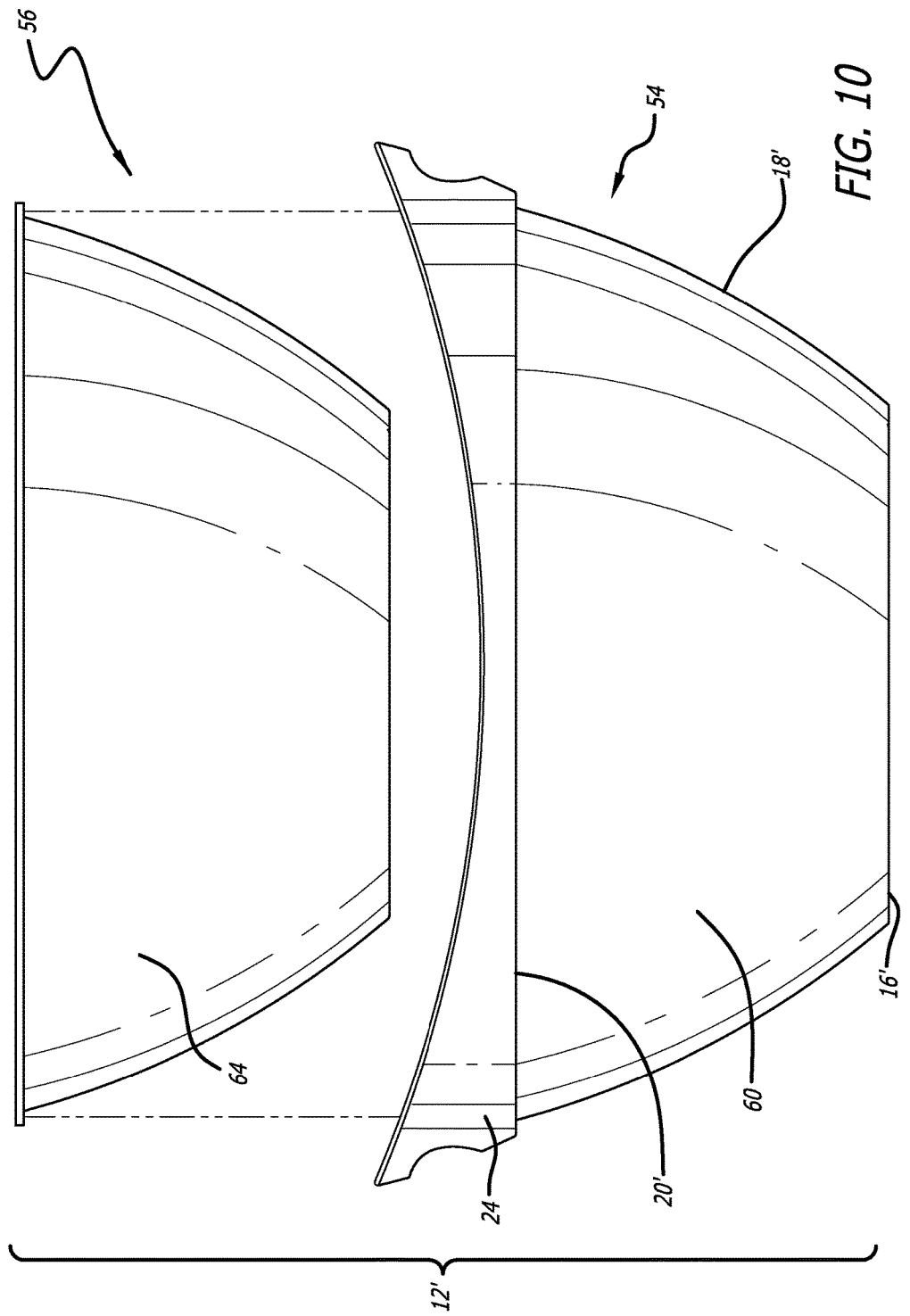
FIG. 10 is a left side view of the storage container shown in FIG. 9.
Figure 11:
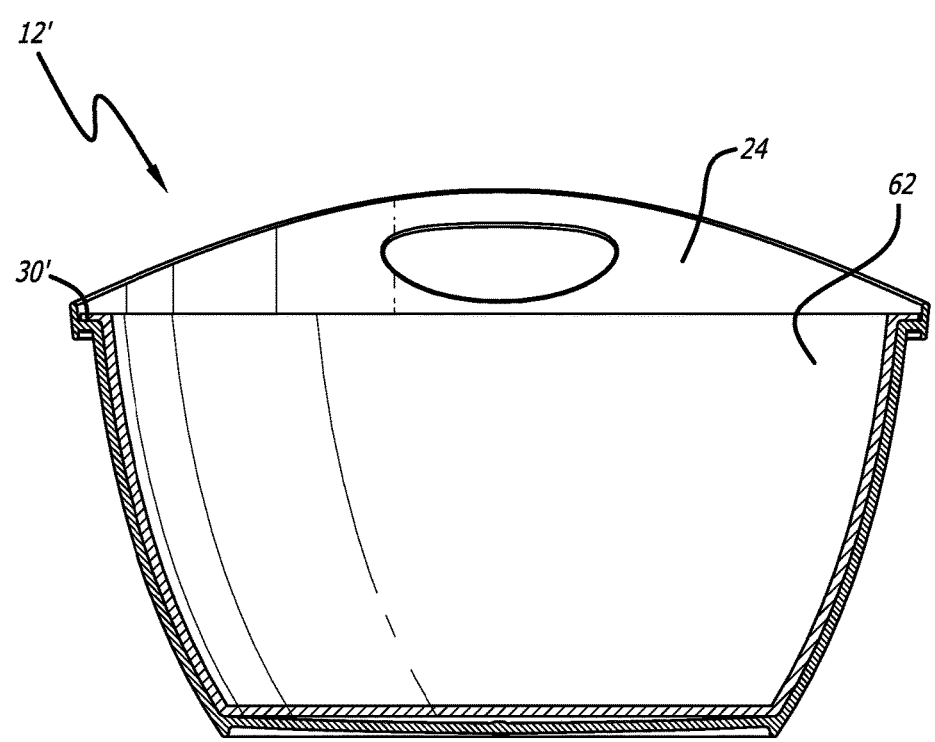
FIG. 11 is a cross-sectional view of the storage container of FIG. 10 taken along line 11-11.
Figure 12:
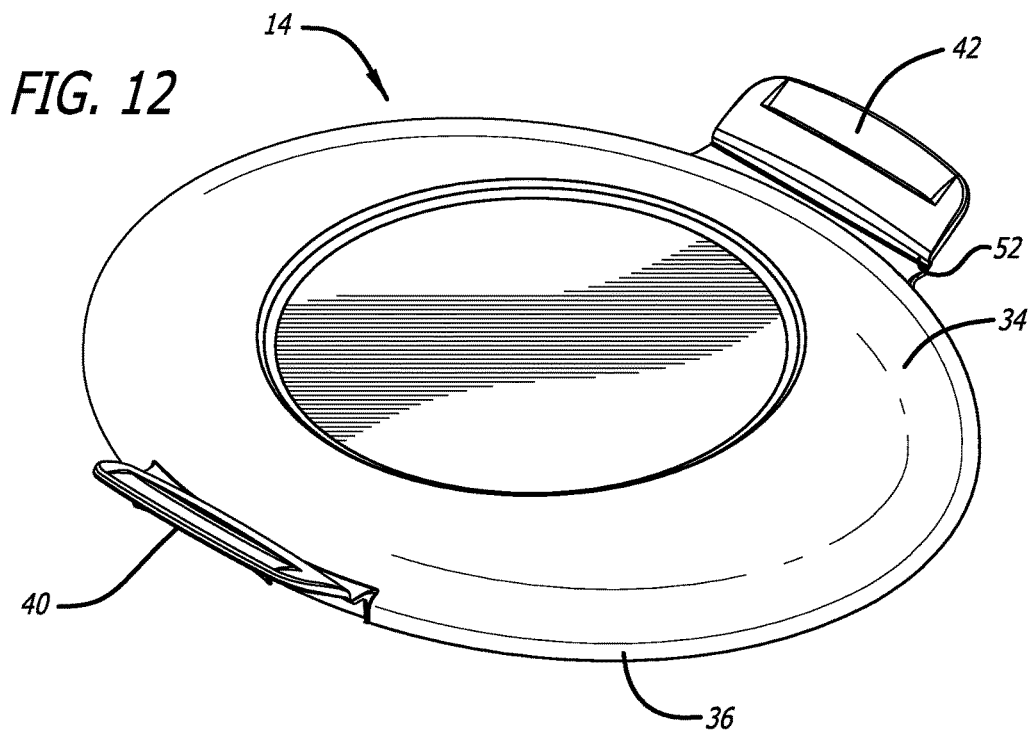
FIG. 12 is a top perspective view of a locking lid for the storage container assembly of the present invention.
Figure 13:
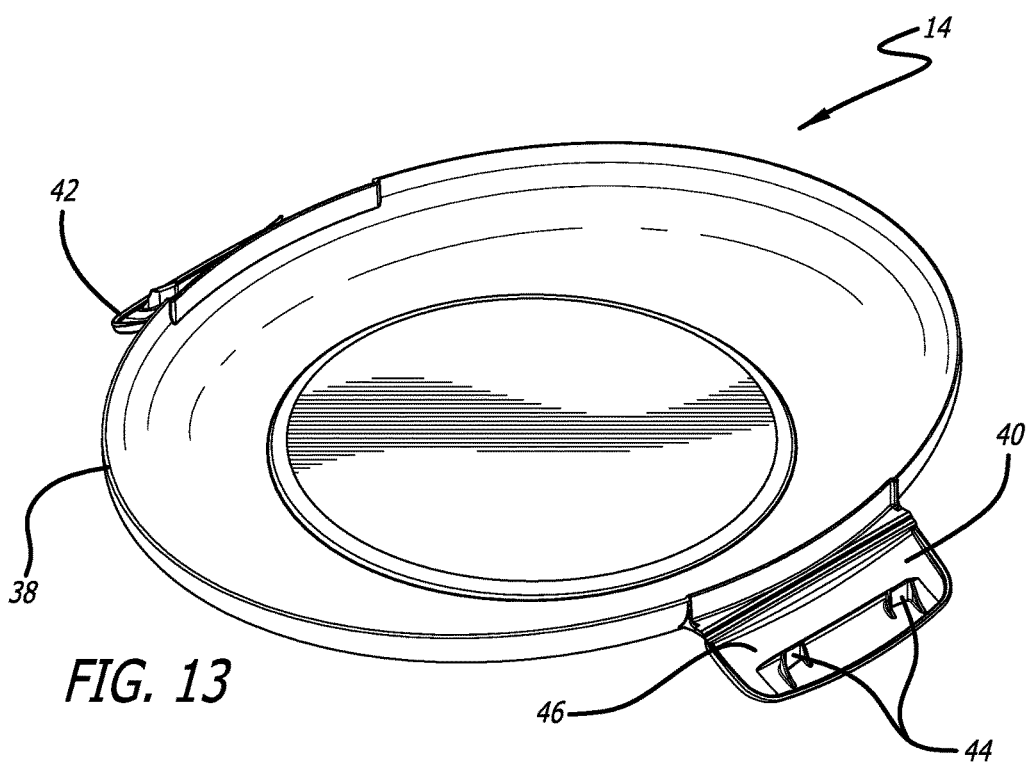
FIG. 13 is a bottom perspective view of the locking lid for the storage container assembly shown in FIG. 12.
Figure 14:
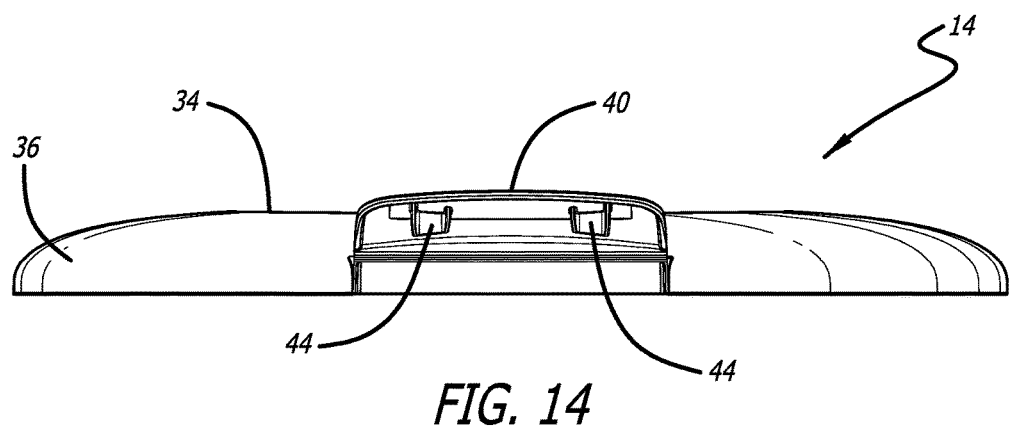
FIG. 14 is a left side view of the locking lid for the storage container assembly shown in FIG. 12.
Figure 15:
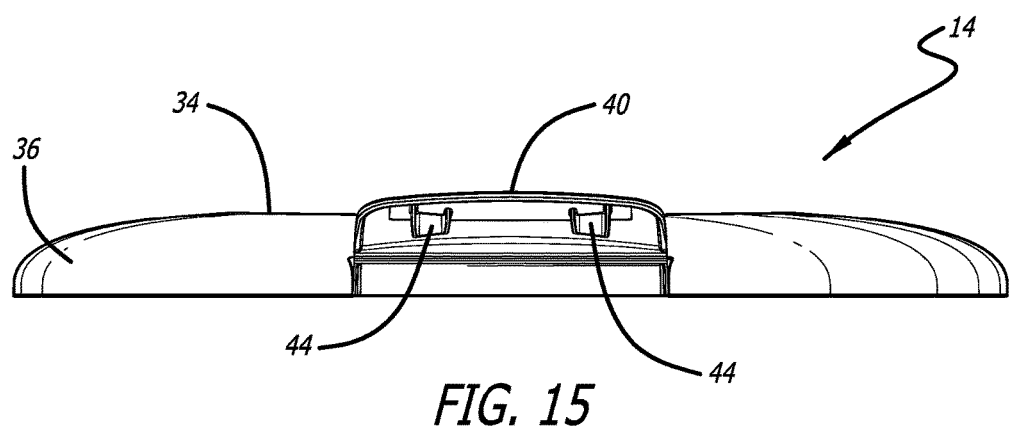
FIG. 15 is a right side view of the locking lid for the storage container assembly shown in FIG. 12.
Figure 16:
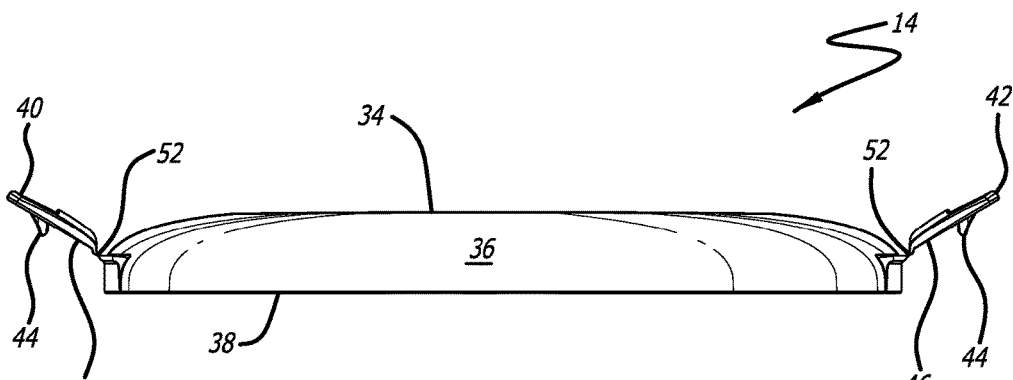
FIG. 16 is a front view of the locking lid for the storage container assembly shown in FIG. 12.
Figure 17:
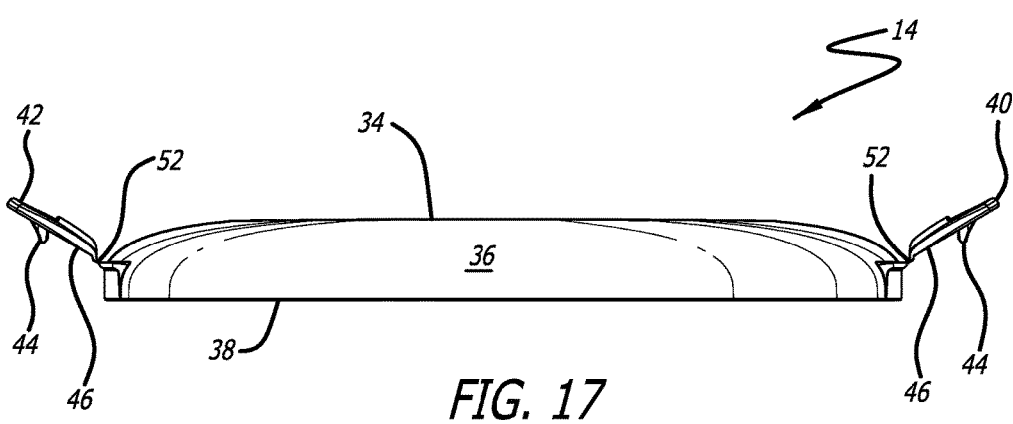
FIG. 17 is a rear view of the locking lid for the storage container assembly shown in FIG. 12.
Figure 18:
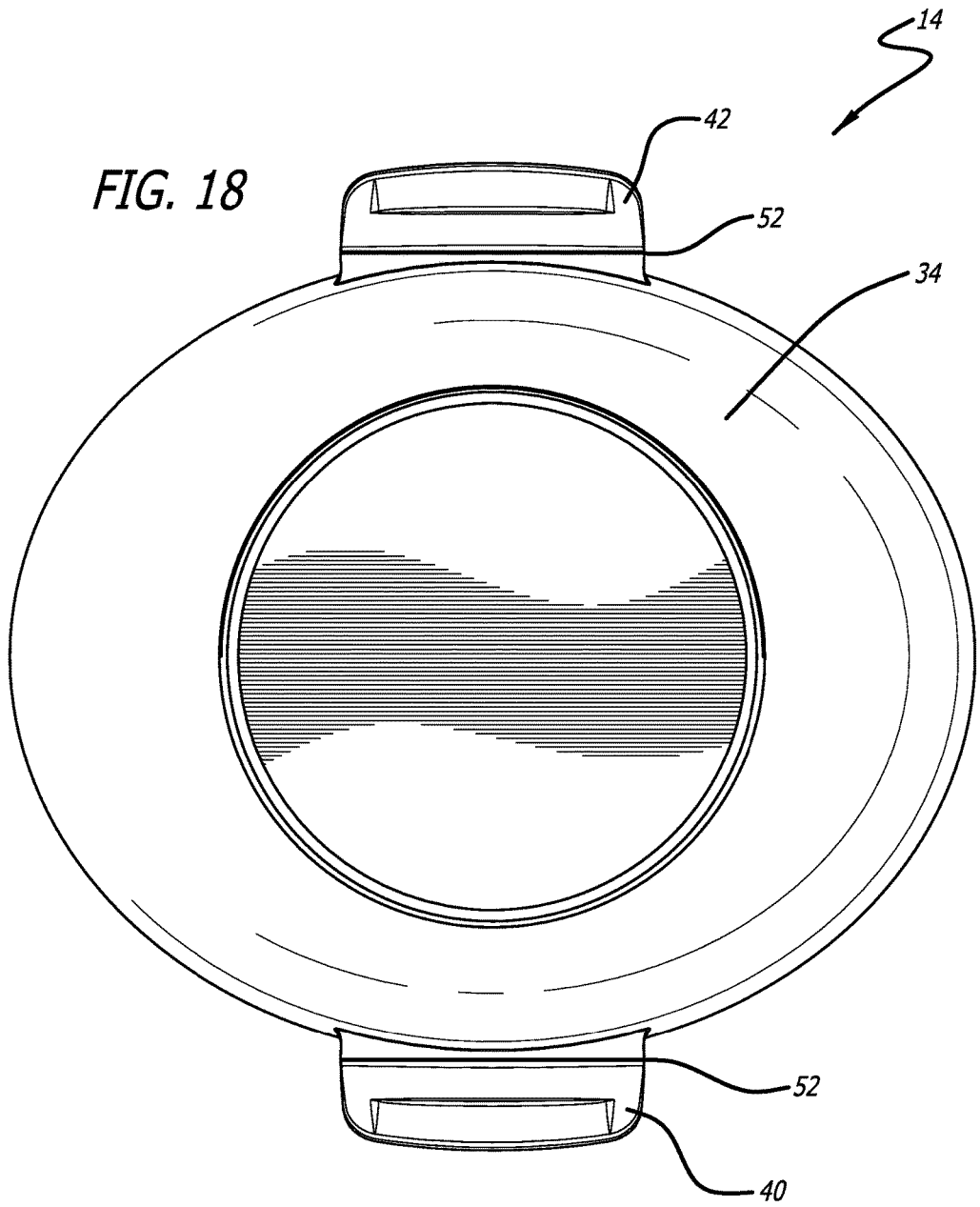
FIG. 18 is a top view of the locking lid for the storage container assembly shown in FIG. 12.
Figure 19:
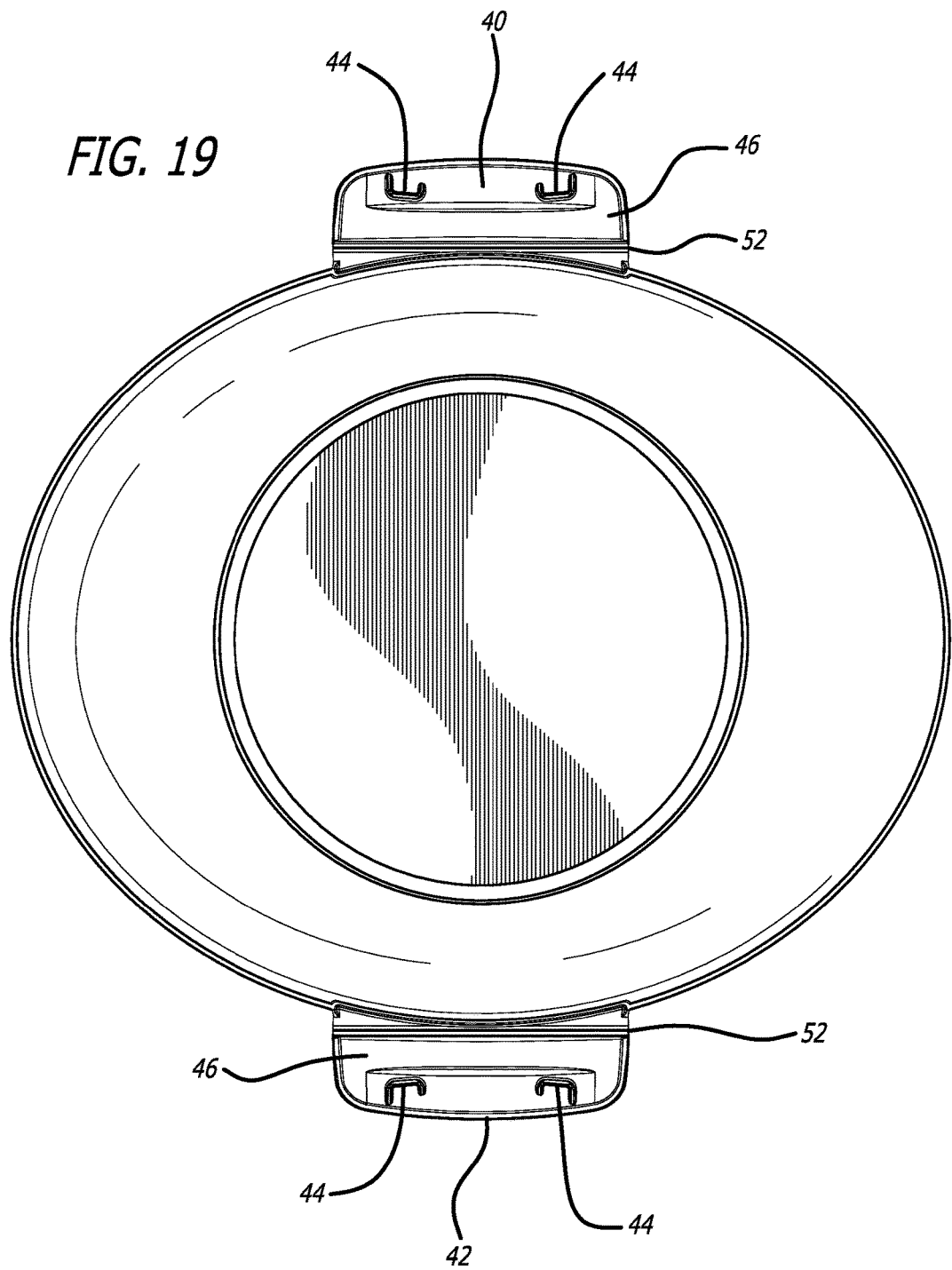
FIG. 19 is a bottom view of the locking lid for the storage container assembly container shown in FIG. 12.
Figure 20:
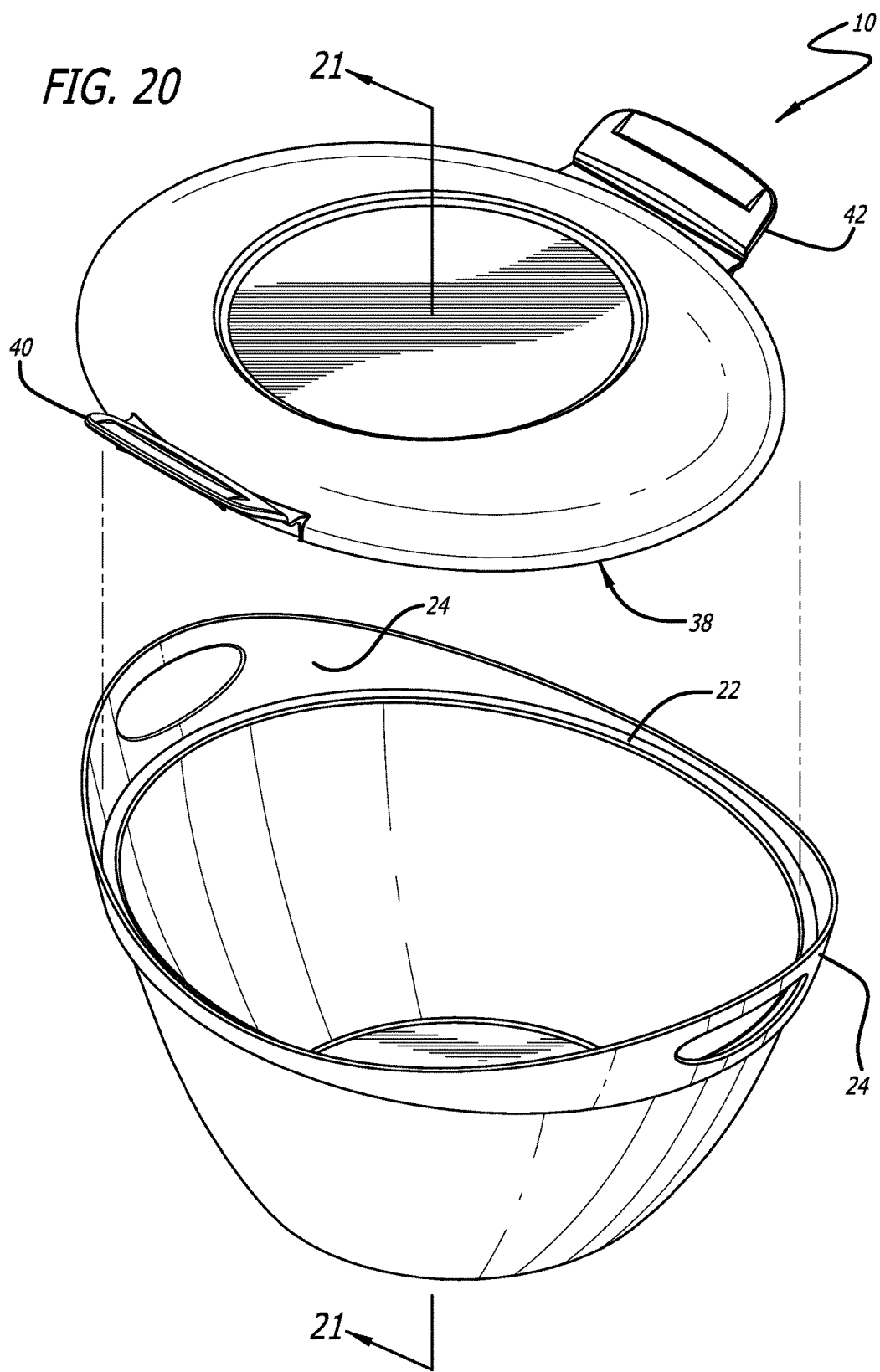
FIG. 20 is an exploded perspective view of the securable storage container assembly according to the present invention.
Figure 21:
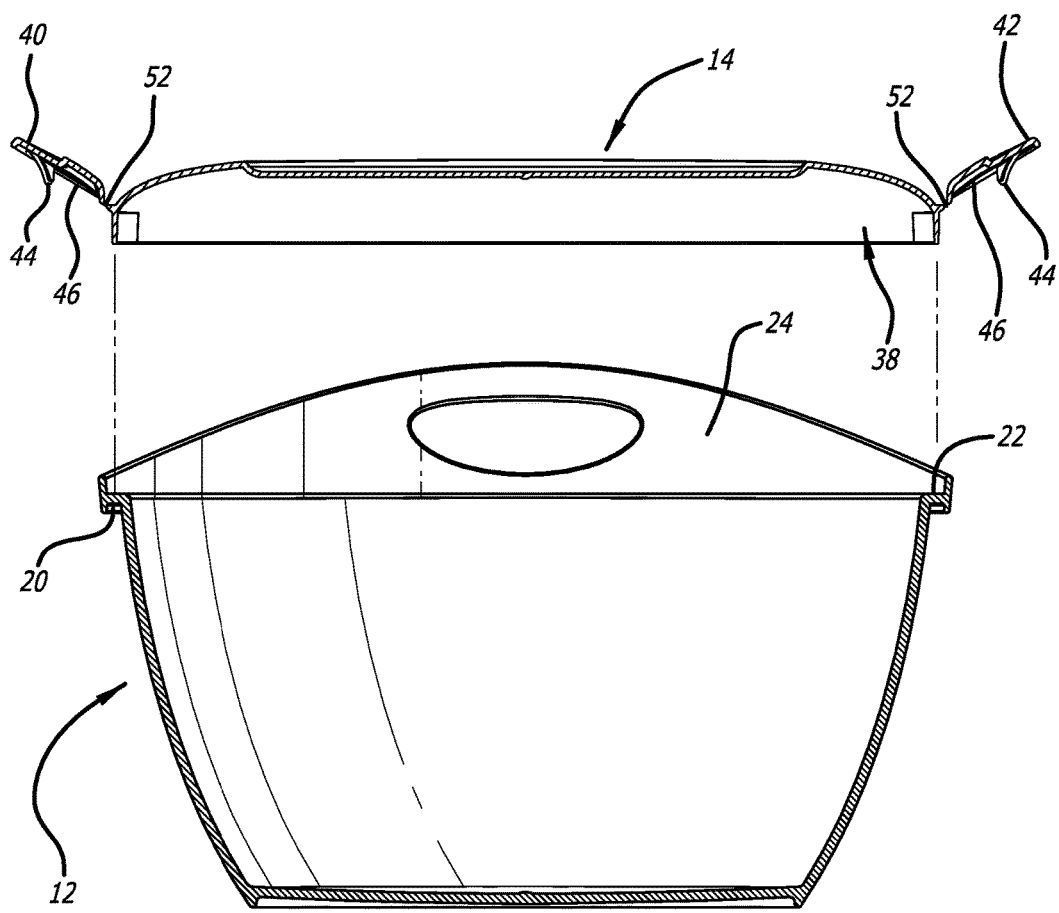
FIG. 21 is a cross-sectional view of the securable storage container assembly in FIG. 20 taken along line 20-20.
Figure 22:
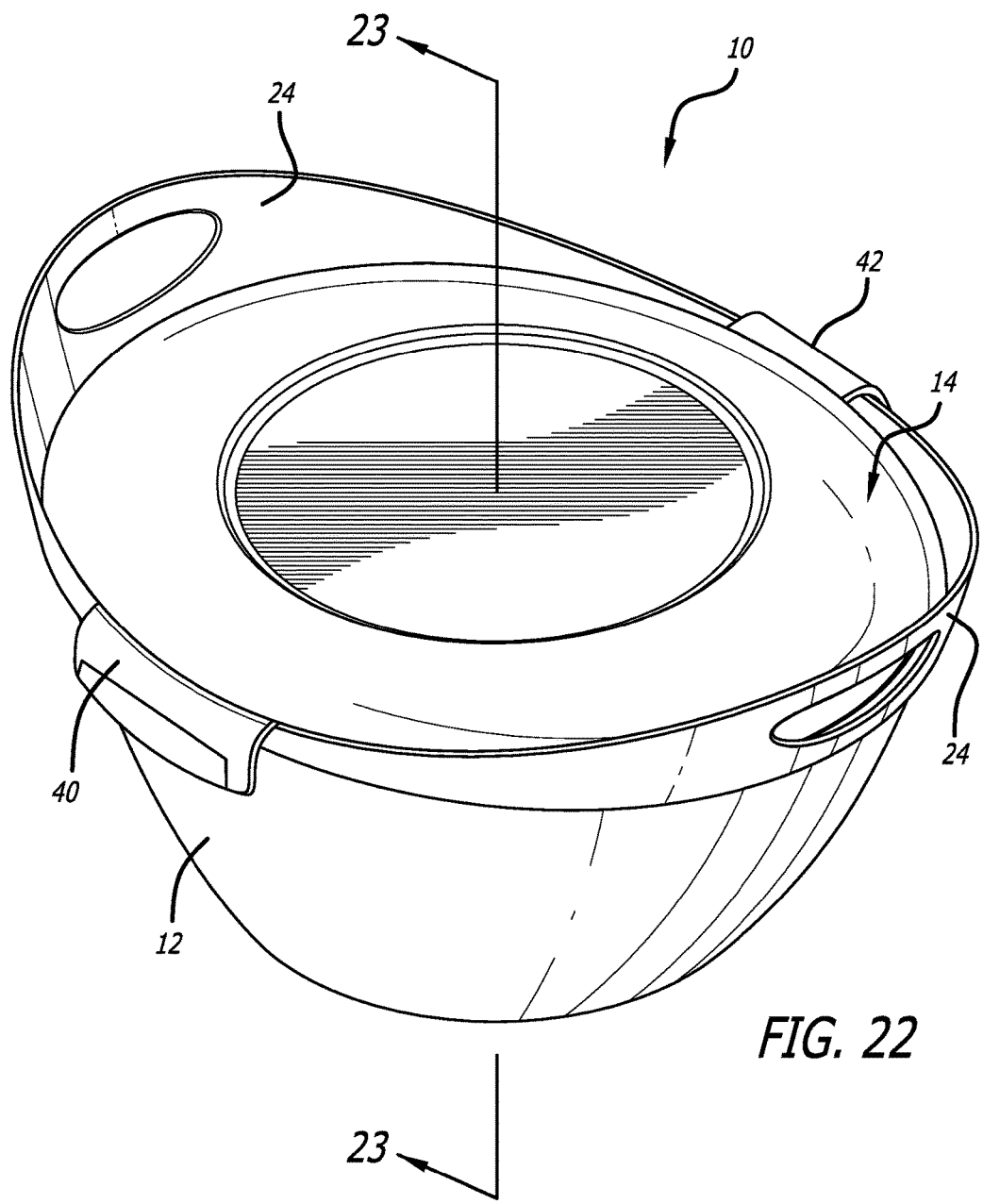
FIG. 22 is perspective view of the securable storage container assembly according to the present invention, illustrating first and second locking arms of the locking lid in a locked position.
Figure 23:
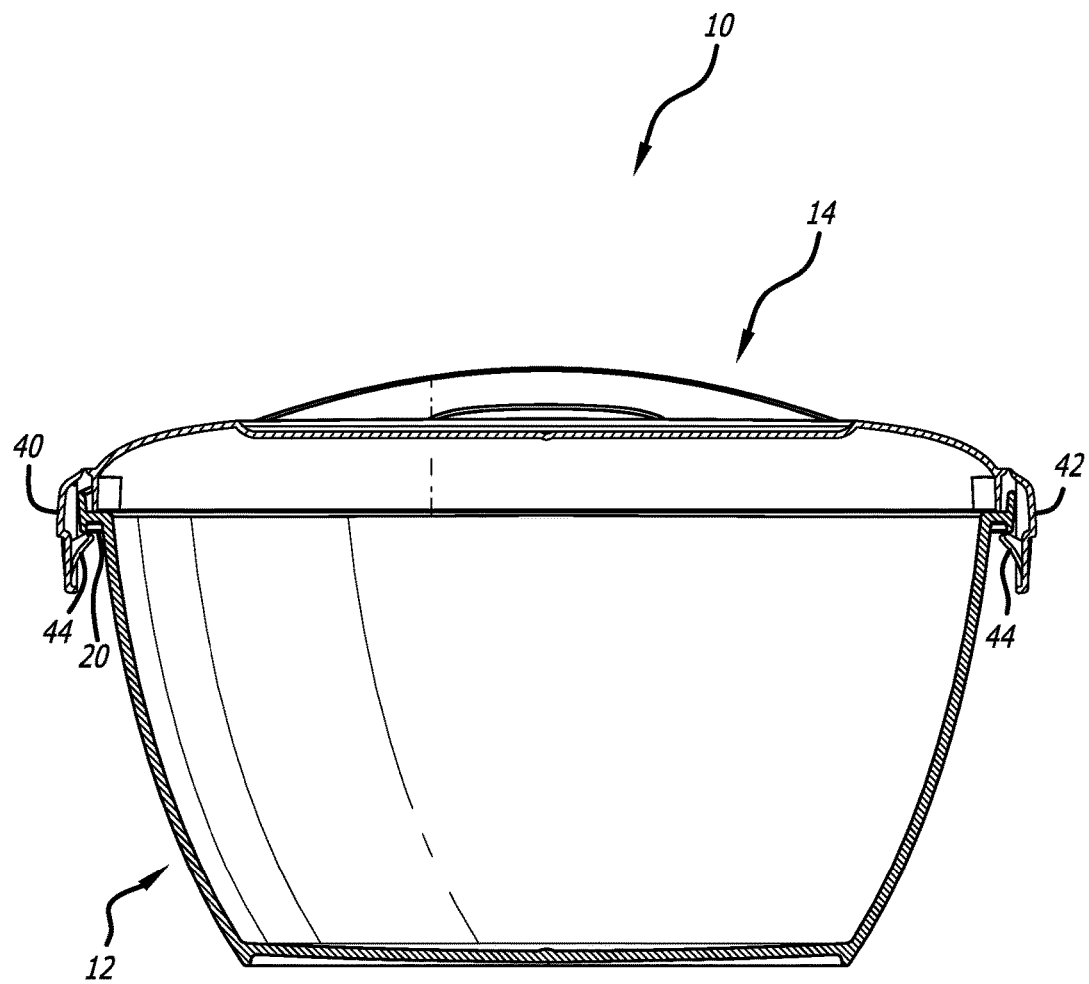
FIG. 23 is a cross-sectional view of the securable storage container assembly in FIG. 22 taken along line 22-22

According to one embodiment of the present invention shown in FIGS. 9-11, the storage container 12' can be comprised of separate first and second containers 54, 56. In that embodiment, the first container 54 has a base 16', an inner surface 58 and an outer surface 60. The outer surface 60 of the first container 54 defines a generally curvilinear outer container sidewall 18'. The first outer container sidewall 18' extends upwardly from the base 16' and terminates in a continuous curvilinear upper rim 30'. That upper rim 30' has a generally parabolic profile and defines a terminal edge of the outer container sidewall 18'. A locking ledge 20' traverses the outer surface 60 of the first container 54.

A second container 56 is disposed within the first container 54. In one embodiment, it is contemplated that the second container 56 be mechanically or chemically coupled to the first container 54. Alternatively, the storage container 12' can be formed via an overmolding process in which the first container 54 is molded over the second container 56. The second container 56 has an inner surface 62 and an outer surface 64. The inner surface 62 of the second container 56 defines a generally curvilinear inner container sidewall 18' that may generally conform to the contours of the inner surface 58 of the first container 54. An upper extent 68 of the inner container sidewall 18' terminates in a resting ledge 22' that traverses the inner surface 58 of the first container 54 and terminates below the upper rim 30' of the first container 54.

It is preferable that the storage container 12, 12' is formed from plastic or a similar material. However, it also is contemplated that, in some embodiments, the container 12, 12' is formed from other materials suitable for food storage such as, for example, glass, glass composites, ceramic or stoneware.

FIGS. 12-19 illustrate a locking lid 14 of the present invention. The lid includes a cover portion having a lid sidewall 36 extending downward therefrom. The sidewall 36 terminates in a lid terminal edge 38 that is configured to abutingly engage the resting ledge 22 of the storage container 12. The locking lid 14 also includes a first locking arm 40 connected to the lid sidewall 36 and a second locking arm 42 connected to the lid sidewall 36 at a position generally opposite the first locking arm 40. Each of the locking arms has a tab member 44 on its inner surface 26 thereof. The tab members 44 are configured to engage at least a portion of the locking ledge 20 of the container and lock the lid in place. It is contemplated that each locking arm can have a plurality of tab members or a single tab member that runs along some or all of a horizontal extent of the first and second locking arms 40, 42.

Figure 3:
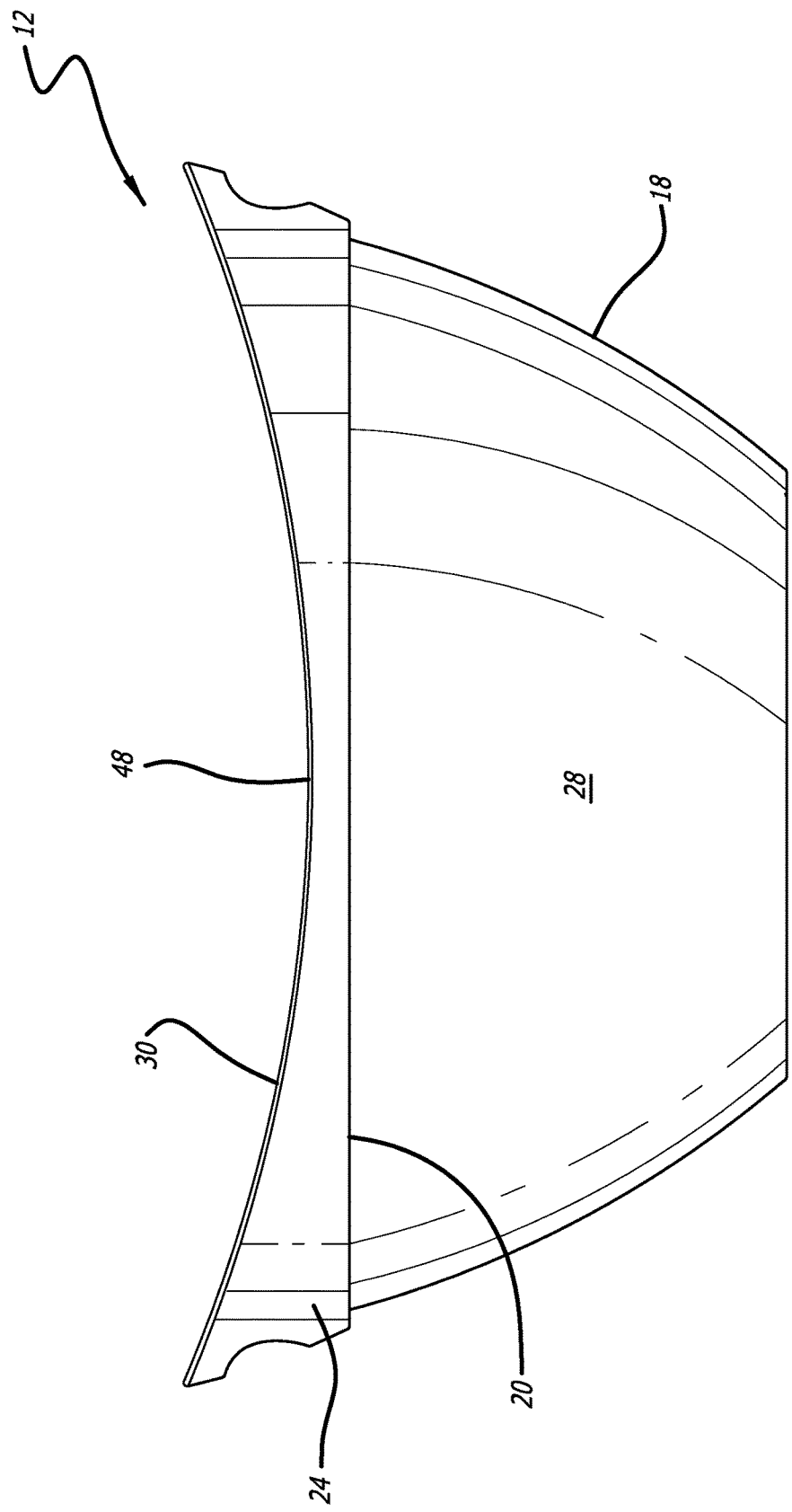
FIG. 3 is a left side view of the storage container shown in FIG. 1.
Figure 4:
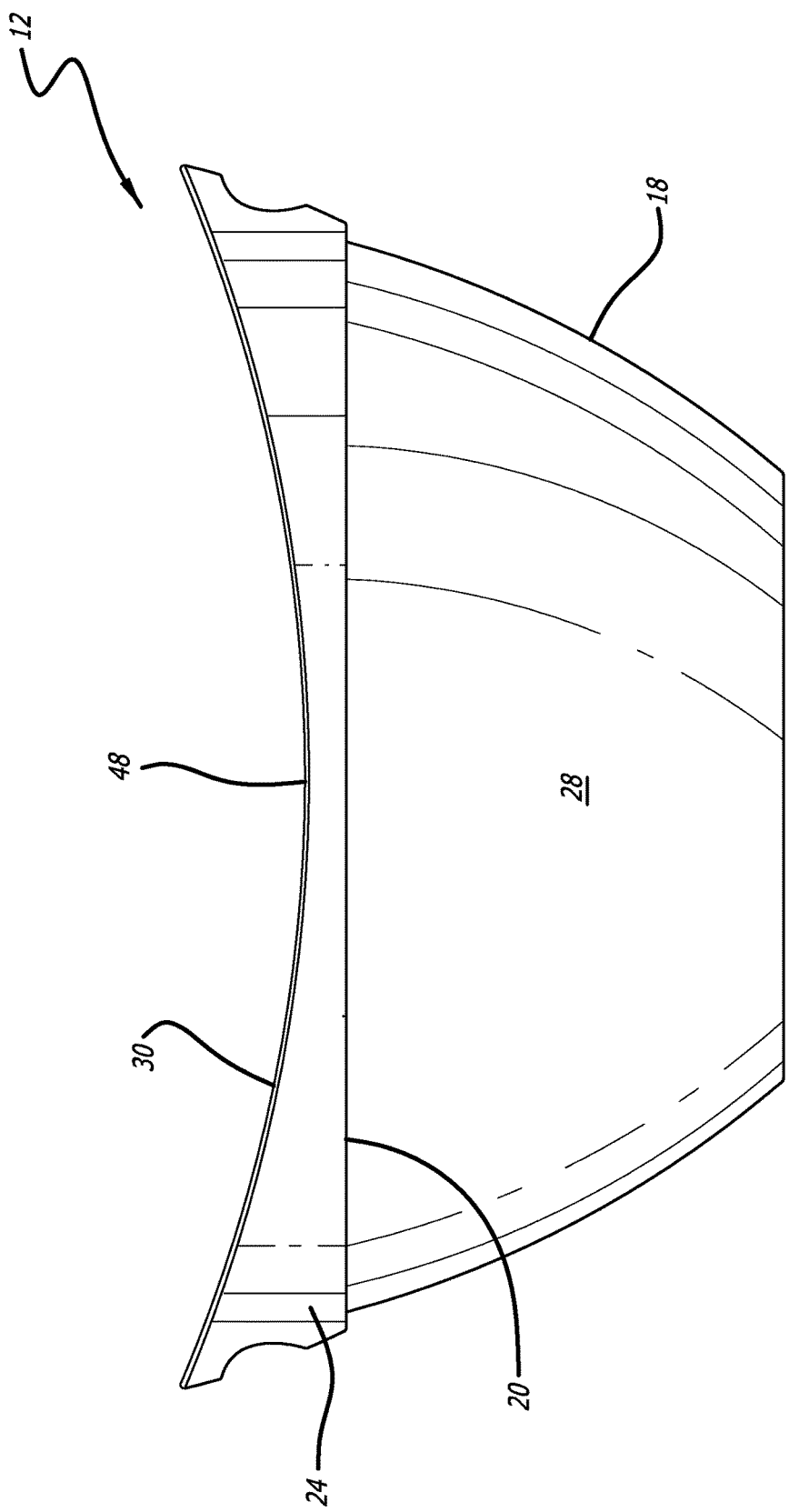
FIG. 4 is a right side view of the storage container shown in FIG. 1.
Figure 5:
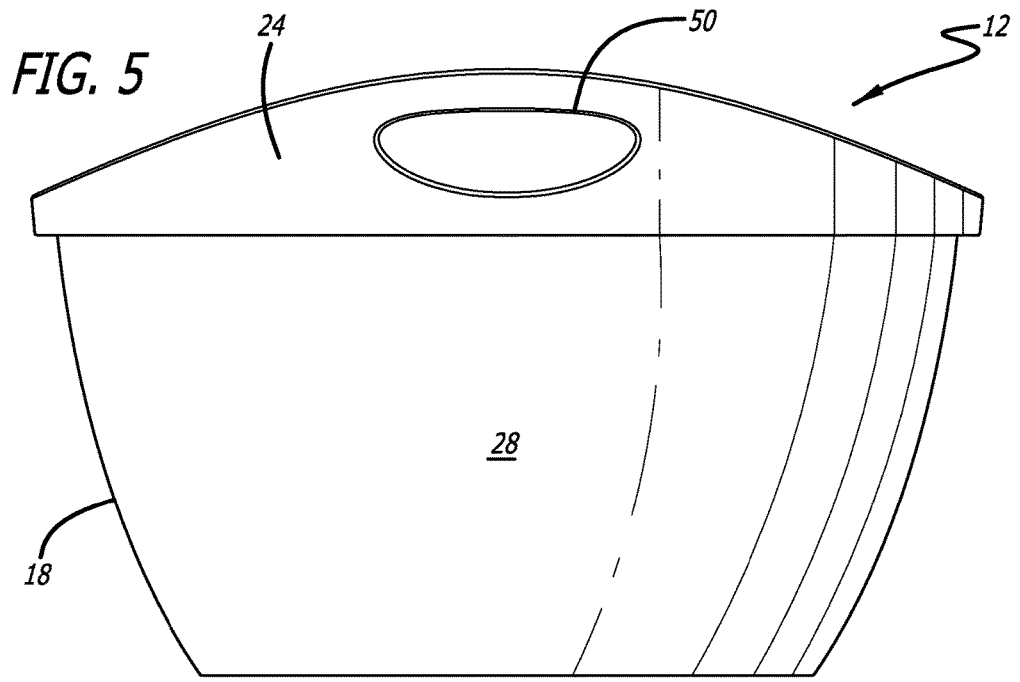
FIG. 5 is a front view of the storage container shown in FIG. 1.
Figure 6:
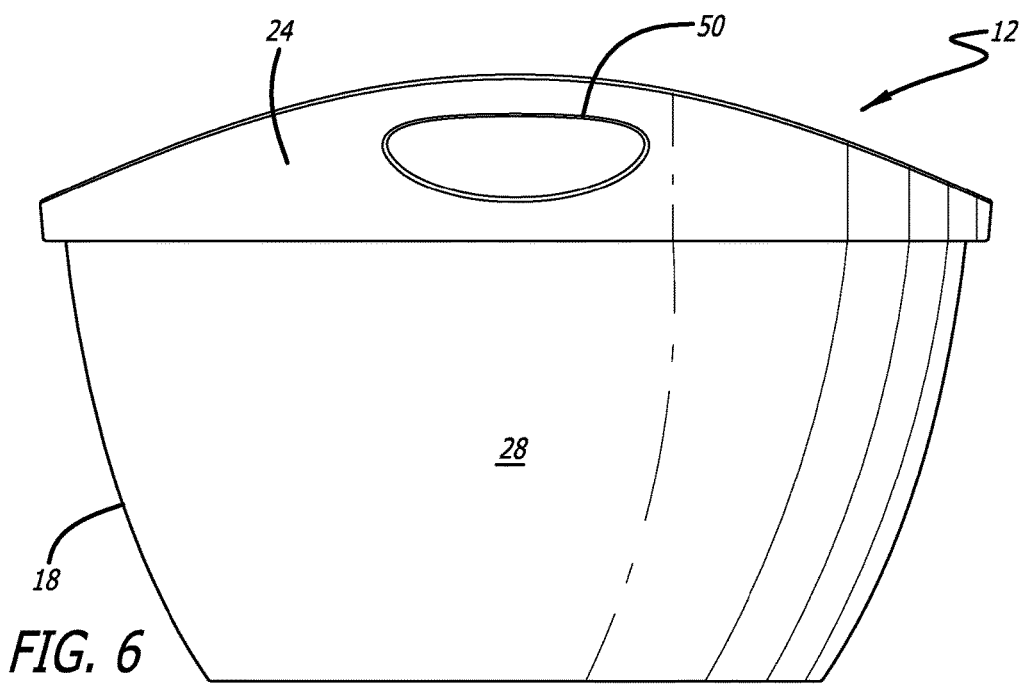
FIG. 6 is a rear view of the storage container shown in FIG. 1.
Figure 7:
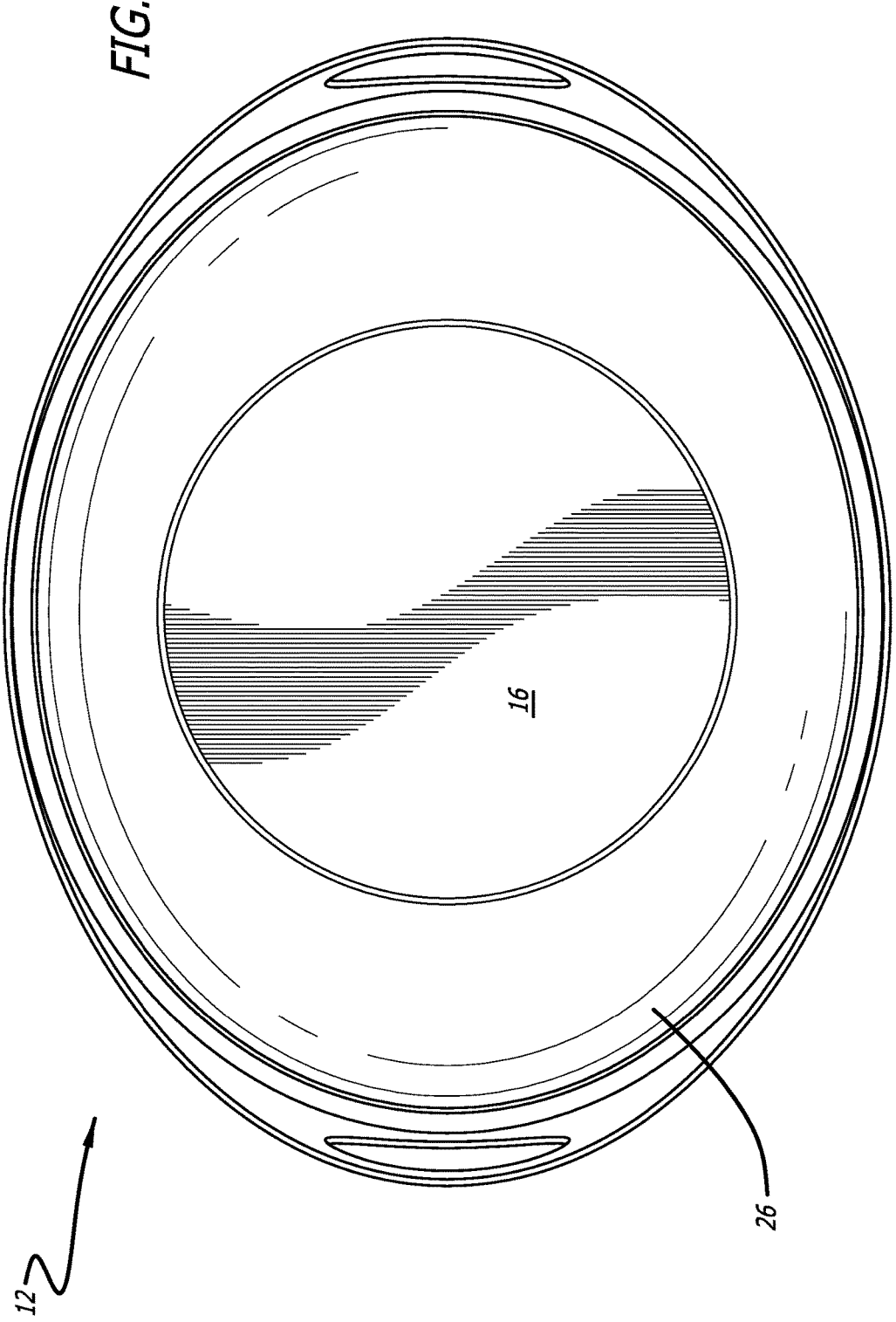
FIG. 7 is a top view of the storage container shown in FIG. 1.
Figure 8:
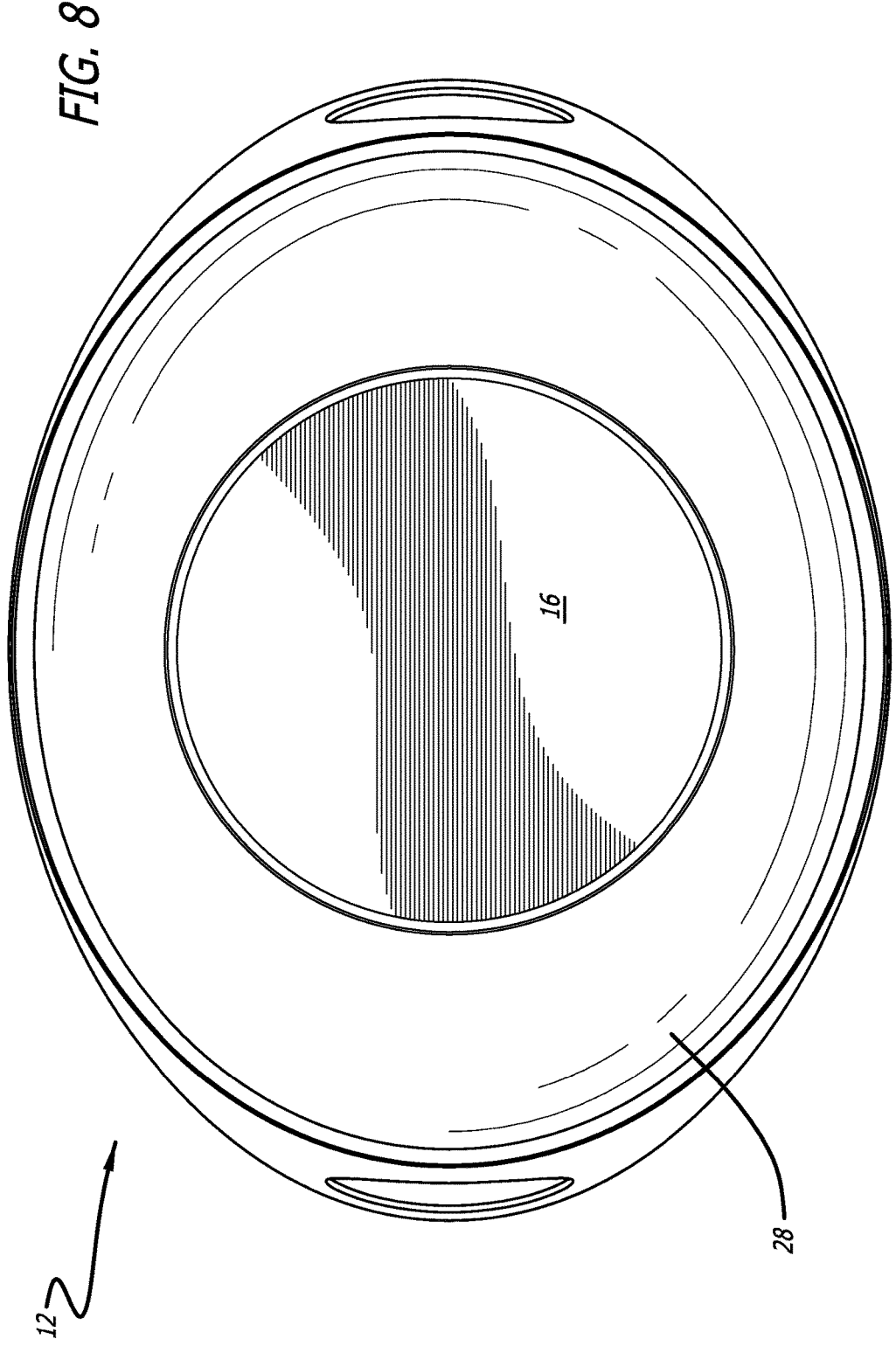
FIG. 8 is a bottom view of the storage container shown in FIG. 1.

The first and second locking arms 40, 42 are independently moveable between a first position and a second position. When the locking arms are in the first position (illustrated in FIGS. 2 and 4), the locking arms extend generally outward from the lid sidewall 36. As shown in FIGS. 1 and 3, when the locking arms are in a second position, the locking arms pivot around the upper rim 30 of the container at a position proximate the lowest extent of the parabolic profile of the upper rim 30 and between the first and second handles. In the second position, the tab members 44 can cooperatively engage the locking ledge 20. According to one embodiment of the present invention as shown in FIGS. 5-11, the first and second locking arms 40, 42 are connected to the sidewall 36 via a living hinge 52. However, it is contemplated that the locking arms may be connected to the lid sidewall 36 by another hinge configuration or any connection method that allows for pivot action between the first and second positions.

As shown in FIGS. 20-23, a method of securing a lid described herein to a storage container described herein is also disclosed. According to the method, a container and lid as described above is provided. A user positions the first and second locking arms at a position proximate the lowest extent of the parabolic profile of the upper and between the first and second handles. The first and second locking arms are moved to the second position and the tabs members are caused to cooperatively engage the locking ledge.

The disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A storage container assembly comprising:
   a container comprising:
      a base;
      a generally curvilinear sidewall having an inner surface and an outer surface, the sidewall extending upwardly from the base and terminating in a continuous curvilinear upper rim having a generally parabolic profile, wherein at least a portion of the upper rim defines a terminal edge of the sidewall rim;
      a locking ledge traversing the outer surface of the sidewall, the locking ledge defined by an outwardly projecting step in the sidewall, wherein the locking ledge is disposed below the terminal edge of the sidewall;
      a resting ledge traversing the inner surface of the sidewall, the resting ledge conforming to the step in the sidewall and being disposed below the terminal edge of the sidewall; and
      upwardly projecting first and second handles defining opposed sides of an upper extent of the sidewall; and,
   a lid comprising:
      a cover portion having a lid sidewall extending downward therefrom and terminating at a lid terminal edge, the lid terminal edge being configured to abutingly engage the resting ledge of the container;
      a first locking arm connected to the sidewall of the lid and a second locking arm connected to the sidewall of the lid at a position generally opposite the first locking arm, each locking arm having a tab member on an inner surface thereof, the tab members being configured for locking engagement with at least a portion of the locking ledge of the container; and
      wherein the first and second locking arms are independently moveable between a first position and a second position, wherein when the locking arms are in the first position the locking arms extend generally outward from the lid sidewall, and when the locking arms are in a second position the locking arms pivot around the upper rim of the container at a position proximate the lowest extent of the parabolic profile of the upper rim and the tab members cooperatively engage the locking ledge.

2. The storage container assembly of claim 1, wherein the locking ledge traverses the entire outer surface of the sidewall.

3. The storage container assembly of claim 1, wherein the first and second locking arms are hingeably connected to the sidewall.

4. The storage container assembly of claim 1, wherein the first and second locking arms are hingeably connected to the sidewall by a living hinge.

5. The storage container assembly of claim 1, further including at least one aperture formed in each of the first and second handles.

6. The storage container assembly of claim 1, wherein when the locking arms are in the second position the locking arms are positioned between the handles.

7. The storage container assembly of claim 1, wherein the container and lid are each formed from a plastic material.

8. The storage container of claim 1, wherein the first and second handles each include at least one aperture therethrough.

9. A storage container assembly comprising:
a first container formed from a plastic material, the first container having a base, an inner surface and an outer surface, the outer surface of the first container defining a generally curvilinear outer container sidewall, the first outer container sidewall extending upwardly from the base and terminating in a continuous curvilinear upper rim, the upper rim having a generally parabolic profile and defining a terminal edge of the outer container sidewall;
a locking ledge traversing the outer surface of the first container;
a second container disposed within the first container, the second container being formed from a plastic material and having an inner surface and an outer surface, the inner surface of the second container defining a generally curvilinear inner container sidewall, an upper extent of the inner container sidewall terminating in a resting ledge traversing the inner surface of the first container and terminating below the upper rim of the first container;
upwardly projecting first and second handles defining opposed sides of an upper extent of the outer container sidewall and above the resting ledge and the locking ledge; and
a lid comprising:
a cover portion having a lid sidewall extending downward therefrom and terminating at a lid terminal edge, the lid terminal edge being configured to abutingly engage the resting ledge of the second container;
a first locking arm connected to the sidewall of the lid and a second locking arm connected to the sidewall of the lid at a position generally opposite the first locking arm, each locking arm having a tab member on an inner surface thereof, the tab members being configured for locking engagement with at least a portion of the locking ledge on the first container; and
wherein the first and second locking arms are independently moveable between a first position and a second position, wherein when the locking arms are in the first position the locking arms extend generally outward from the lid sidewall, and when the locking arms are in a second position the locking arms pivot around the upper rim of the first container at a position between the handles and proximate the lowest extent of the parabolic profile of the upper and the tab members cooperatively engage the locking ledge.

10. The storage container assembly of claim 9, wherein the second container further includes a base.

11. The storage container assembly of claim 9, wherein the second container is coupled to the first container.

12. The storage container assembly of claim 11, wherein the first container is molded over the second container.

13. The storage container assembly of claim 9, wherein the locking ledge traverses the entire outer surface of the sidewall.

14. The storage container assembly of claim 9, wherein the locking ledge is defined by an outwardly projecting step in the sidewall and the resting ledge conforms to the step in the sidewall.

15. The storage container assembly of claim 9, wherein the first and second locking arms are hingeably connected to the sidewall.

16. The storage container assembly of claim 15, wherein the first and second locking arms are hingeably connected to the sidewall by a living hinge.

17. The storage container assembly of claim 9, wherein the lid is formed from a plastic material.

18. A method of securing a locking lid to a storage container, the method comprising:
providing for a storage container comprising, a base, a generally curvilinear sidewall having an inner surface and an outer surface, the sidewall extending upwardly from the base and terminating in a continuous curvilinear upper rim defining a terminal edge of the sidewall, the upper rim having a generally parabolic profile; a locking ledge traversing at least a portion of the outer surface of the sidewall, the locking ledge defined by an outwardly projecting step in the sidewall, wherein the locking ledge is disposed below the terminal edge of the sidewall and a resting ledge traversing the inner surface of the sidewall, the resting ledge conforming to the step in the sidewall and being disposed below the terminal edge of the sidewall; and upwardly projecting first and second handles defining opposed sides of an upper extent of the sidewall;
providing for a lid comprising a cover portion having a lid sidewall extending downward therefrom and terminating at a lid terminal edge, the lid terminal edge being configured to abutingly engage the resting ledge of the container; a first locking arm connected to the sidewall of the lid and a second locking arm connected to the sidewall of the lid at a position generally opposite the first locking arm, each locking arm having a tab member on an inner surface thereof, the tab members being configured for locking engagement with at least a portion of the locking ledge of the container, wherein the first and second locking arms are independently moveable between a first position and a second position, wherein when the locking arms are in the first position the locking arms extend generally outward from the lid sidewall, and when the locking arms are in a second position the locking arms pivot around the upper rim of the container at a position proximate the lowest extent of the parabolic profile of the upper rim and the tab members cooperatively engage the locking ledge;
positioning the first and second locking arms at a position proximate the lowest extent of the parabolic profile of the upper and between the first and second handle; and,
moving the first and second locking arms to the second position and causing the tab members to cooperatively engage the locking ledge.

19. The method of claim 18, wherein the storage container is comprised of a first container and a second container, each of the first and second containers being formed from a plastic material, the outer surface of the first container defining the sidewall and an inner surface of the second container defining a generally curvilinear inner container sidewall, an upper extent of the inner container sidewall defining the resting ledge.

* * * * *